: # 2,813,797

THICKENED FRUIT COMPOSITIONS COMPRISING CARBOXYMETHYL DEXTRAN

Harry A. Toulmin, Jr., Dayton, Ohio, assignor, by mesne assignments, to Midland Chemical Corporation, Dayton, Ohio, a corporation of Delaware No Drawing. Application July 13, 1954, Serial No. 443,137

3 Claims. (Cl. 99—102)

In the making of baked good containing fruits, such as fruit pies and tarts, by introducing the fruit into a suitable pie shell or the like, it is usually necessary to include a thickener with the fruit in order to increase its viscosity so that "running" of the juice is minimized or prevented and to assist in maintaining the small fruits or fruit fragments uniformly distributed through the filling during baking of the goods. Viscous custard- or jelly-like fillings are used in the baking of berry pies and tarts, for example. The berries may be canned and may be packed in an aqueous solution of fruit juices and sugar. If so, the baker will invariably incorporate a thickener in the canned fruit before using the same as filling for a pie. In the case of small berries, the thickener is practically essential to the baking of a product of satisfactory appearance. When larger types of fruit such as apples or peaches, are used as the filling, these may be cut into relatively large pieces or slices but even with such fruits the addition of a thickening agent is desirable.

Unless fruits canned or otherwise packed in syrup are thickened to a viscous or semi-solid consistency before they are used as fillings, the juices are not retained in the filling but seep through the shell or crust and render it soggy and unpalatable if not inedible.

The objects of the invention are accomplished by incorporating carboxymethyl dextran with the fruit composition.

Other objects and advantages of the invention will become apparent from the detailed description of the invention which follows.

The production of carboxymethyl dextran is described in the pending application of L. J. Novak et al., Ser. No. 346,016, filed March 31, 1953. As described therein, the selected dextran is reacted with a carboxymethylating agent in aqueous alkaline medium whereby the carboxymethyl group is substituted for one or more hydroxyl groups in the dextran molecule. Suitable carboxymethylating agents are chloracetic acid, sodium chloracetate and chloracetamide. The reaction is carried out in aqueous solution or suspension containing a dissolved strong alkali metal hydroxide such as sodium, potassium or lithium hydroxide. Preferably, the dextran is treated, in aqueous solution or suspension, with an excess of sodium or potassium chloracetate in the presence of an excess of sodium or potassium hydroxide at 50° C. to 100° C. for ten minutes to two hours. Also preferably, the molar ratio of sodium or potassium chloracetate to dextran is between 2:1 and 12:1, the molar ratio of sodium or potassium hydroxide to dextran is between 5:1 and 15:1, and the molar ratio of water to dextran is between 70:1 and 120:1. The carboxymethyl dextran obtained has a D. S. (degree of substitution or average number of carboxymethyl groups per anhydroglucopyranosidic unit) of less than 1.0, usually 0.2, to 3.0.

The reaction product is a viscous mass comprising the sodium or potassium salt of the carboxymethyl dextran, which can be precipitated by addition of a water-miscible alcohol or ketone such as methyl, ethyl, propyl, isopropyl or t. butyl alcohol or acetone.

The alkali metal salt, and particularly the sodium salt, can be used as such in thickening the fruit compositions, in some instances.

If the free carboxymethyl ether is to be added to the fruit composition, it can be recovered from the salt by mixing the latter with water, acidifying to pH about 2.0 and precipitating the ether by means of acetone or a water-miscible alcohol as mentioned above. The pH of 2.0 is not critical and the ether may be precipitated at other acid pH values. However, the highest yields of the free ether have been obtained by precipitation at pH 2.0.

The dextran reacted with the carboxymethylating agent may be biosynthesized from sucrose by microorganisms of the *Leuconostoc mesenteroides* and *L. dextranicum* types, or their enzymes. Microorganisms which may be used include those bearing the following NRRL (Northern Regional Research Laboratory) designations: *Leuconostoc mesenteroides* B–512, B–119, B–1146, B–1190, B–742, B–1191, B–1196, B1208, B–1216, B–1120, B–1144, B–523; *Streptobacterium dextranicum* B–1254 and *Betabacterium vermiforme* B–1139.

The procedure is to introduce a culture of the microorganism, or the enzyme filtered from the culture, into a sucrose-bearing nutrient medium containing appropriate inorganic salts and nitrogenous materials, incubate the mass until the dextran is produced in maximum yield, precipitate the dextran by the addition of a water-miscible alcohol or ketone, purify the precipitate and reduce it to particulate condition. The "native" dextran so obtained is normally characterized by very high molecular weight calculated to be in the millions. It may be reacted at the high molecular weight with the carboxymethylating agent or it may be partially hydrolyzed to low molecular weight between the initial weight and 5000. As is known, native dextran can be microbiologically produced under controlled conditions such that the dextran has a lower molecular weight than is characteristic of native dextran produced under conventional conditions. The native dextran of lower than usual molecular weight may also be reacted with the carboxymethylating agent to obtain ethers and salts for addition to the fruit compositions.

Relatively small quantities of the carboxymethyl dextrans of D. S. 0.2 to 3.0 are effective for increasing the viscosity of the compositions to render them non-running. Amounts of 0.2% to 5.0% by weight are usually satisfactory. However, a preferred ether is that derived from high molecular weight, native, unhydrolyzed *L. m.* B–512 dextran or an equivalent dextran and containing an average of 2.0 to 3.0 carboxymethyl groups per anhydroglucopyranosidic unit. These highly substituted ethers are effective for increasing the viscosity of the fruit compositions in a very small amounts of 0.2% to 0.5%.

The carboxymethyl dextran or alkali metal salt thereof may be incorporated with the fruit and syrup just prior to baking pies or the like and may be packaged separately from but marketed with dried fillings adapted to be mixed with water and sugar before use. The preferred practice is to use the ether or salt in the preparation of precooked fruit compositions or fillings which are canned or otherwise packed under vacuum and which are ready for use on removal from the can, jar or the like, for baking pies, tarts and similar delicacies or as topping for cake, ice cream, and so on, without further modification. The thickened fruit compositions of the invention may also be frozen by quick-freezing methods and when this is done the carboxymethyl dextran also serves to inhibit the formation of ice crystals in the syrup.

For canning, the compositions are prepared by mixing pieces of fruit, berries, etc. pre-treated in various ways if desired, with an aqueous solution or suspension of a thickening amount of the carboxymethyl dextran, sugar and other ingredients, such as spices, as desired, the composition is introduced into cans, the latter, after filling, are heated to remove trapped air, sealed and heat-processed. If the compositions are to be frozen, the freezing may be carried out directly, without a heat-processing step. Whatever packaging technique is employed, the carboxymethyl dextran performs the additional function of forming a film over the fruit pieces which protects them from oxidative and other harmful effects to which they may be exposed during the handling incidental to packing, or after the package has been opened. In a variation of the canning procedure described, the fruit may be cooked in the aqueous sugar solution, for example in the open cans, and the dextran or its derivative may be added just before the can is evacuated and sealed. Mixtures of the dextrans and dextran derivatives may be used, but an advantage of the invention is that mixture of two types of thickening agents are not required. The carboxymethyl dextran ethers, being highly hydrophilic large molecule substances which exert a definite osmotic pressure, tend to attract and absorb comparatively large amounts of moisture. They absorb the juice or syrup in which the fruit is packed and also absorb juice exuded by the fruit during baking of the pie. Another advantage of the carboxymethyl dextran is that it is easily and readily distributed through the aqueous fruit mix by simple relatively slight stirring which does not bruise or damage the fruit.

Any of the available sugars or sugar equivalents may be used for sweetening the compositions. Sucrose and dextrose are usually most readily available and convenient, but invert sugar and fructose may also be used. In preparing special dietetic compositions in which sugar is undesirable, sweetening substitutes such as saccharin may be used.

Various kinds of fruits may be used in preparing the thickened compositions, including cherries, apples, peaches, apricots, cranberries, plums, grapes, strawberries, blueberries, blackberries, kumquats.

Generally, fruit is selected and pretreated before it is mixed with the aqueous sugar solution. This pretreatment may vary, depending on the fruit used. For example, apples or peaches are usually peeled, the core or pit is removed, and the fruit is sliced. Apples may be pared, sliced, and soaked in brine to offset the tendency to develop brown spots. Berries may be merely washed to remove dirt, while cherries may be pretreated in the cold, as by soaking in cold water, to harden them and condition them for removal of the stones.

In canning, the fruit, after such pretreatment as may be indicated, may be brought to the approximate temperature at which it is to be heat-processed by means of steam. During such period, the thickened syrup may be prepared by dissolving the predetermined amount of sugar (equivalent or substitute) in water and adding the carboxymethyl dextran or alkali metal salt, either in the form of a finely divided substantially pure powder or as an aqueous solution or dispersion.

The thickened syrup thus obtained is then mixed with the pretreated and preheated fruit, after which the mixture may be heat-processed, for instance at 150 to 200° F.

Conventional canning techniques may be used. The syrup may be partially thickened in a preliminary step in which all of the ether or derivative is not dissolved, and the partially thickened mass may be mixed with the fruit and introduced into cans or the like which, after evacuation of air and sealing, are heat-processed during which complete dissolution of the ether or derivative is effected. This may have the practical advantage of permitting filling of the cans with a relatively fluid mix, so that a transporting and handling of the final highly viscous or semi-solid mix are avoided.

For freezing, the thickened solution or syrup is prepared, mixed with the fruit (which may be precooked and cooled or which, as in the case of rhubarb is preferably not precooked) and the mass is frozen by usual quick-freezing methods. The carboxymethyl dextran film on the fruit safeguards it even on defrosting of the product, which is particularly advantageous in the case of those fruits, such as peaches, which when frozen and then defrosted tend to undergo oxidative browning very rapidly.

The following examples, in which the parts are by weight unless otherwise stated, are illustrative of specific embodiments of the invention.

*Example I*

Cherries are soaked for about 12 hours in cold water, pitted and blanched by steaming. A thickened syrup is prepared by dissolving about 15 lbs. of sugar in 11 lbs. of water, and adding, with stirring, about 5 lbs. of sugar and about 1 lb. of powdered water-soluble carboxymethyl dextran derived from partially hydrolyzed "native" *Leuconostoc mesenteroides* B–512 having a molecular weight of 20,000 to 200,000, average 60,000 to 75,000 and containing an average of 2.5 carboxymethyl groups per AGU. This thickened mass is then mixed with the steamed cherries, and the mixture is poured into cans. The ratio of syrup to cherries in the cans is from about 1:1 to 1:4. The filled cans are exhausted, sealed and heat-processed.

*Example II*

The procedure of Example I is followed, with the exception that peaches are canned, the carboxymethyl dextran is derived from unhydrolyzed native *L. m.* B–512 water-soluble dextran and containing an average of 2.9 carboxymethyl groups per AGU, and the ratio of syrup to fruit is about 1:2.

*Example III*

Example I is repeated except that the fruit is pitted cranberries and the carboxymethyl dextran is the low or "tail" fraction of average molecular weight between 5,000 and 50,000 present in the supernatant obtained by fractionating hydrolyzed *L. m.* B–512 dextran to obtain "clinical" dextran and normally discarded as waste material in conventional clinical dextran production, the ether containing an average of 2.0 carboxymethyl groups per AGU.

On removal from the cans, in which the fruit is cooked while held in suspended condition by the thickened syrup and "glazed" with a carboxymethyl dextran film, the mix can be spooned into a pie shell. Since the individual berries or pieces of fruit are held in suspension in the dextran ether thickened syrup during transportation, and not subjected to tumbling or jostling around in a watery syrup, they are not bruised in transit, are in excellent condition when introduced into the pie shell or the like and, moreover, retain their original color and flavor to a marked extent.

The carboxymethyl dextran may also be used in admixture with small amounts (not over 1.5% of the total thickener) of thickening agents such as vegetable gum, e. g., locust bean gum or carob, Indian gum, tragacanth and karaya, or a gum of marine algal origin such as algin, Irish moss and agar-agar. Long cell starches such as potato starch, wheat starch, arrowroot, waxy maize and tapioca may also be used but are preferably avoided. If a starch is used, a pregelatinized form is preferred.

The carboxymethyl dextran and the alkali metal salts thereof are bland, non-irritating, non-toxic substances which are essentially without definite "taste" or flavor. They do not effect the flavor of the fruit fillings.

Various changes and modifications may be made in the details given herein without departing from the spirit and scope of the disclosure or of the invention. It will be understood, therefore, that the invention is not intended to be limited except as defined in the appended claims.

What is claimed is:

1. A fruit composition comprising pieces of fruit suspended in a thickened syrup containing, as thickening agent, from about 0.2% to about 0.5% by weight of carboxymethyl dextran derived from high molecular weight, native, unhydrolyzed microbiologically produced dextran and containing an average of 1.0 to 3.0 carboxymethyl groups per anhydroglucopyranosidic unit.

2. A fruit composition comprising pieces of fruit suspended in an aqueous sugar solution containing, as thickening agent, from about 0.2% to about 0.5% by weight of carboxymethyl dextran derived from high molecular weight native, unhydrolyzed microbiologically produced dextran and containing an average of 1.0 to 3.0 carboxymethyl groups per anhydroglucopyranosidic unit.

3. A fruit composition comprising a heat-processed suspension of fruit pieces in a thickened syrup containing, as thickening agent, from about 0.2% to about 0.5% by weight of carboxymethyl dextran derived from high molecular weight, unhydrolyzed microbiologically produced dextran and containing an average of 1.0 to 3.0 carboxymethyl groups per anhydroglucopyranosidic unit.

References Cited in the file of this patent

UNITED STATES PATENTS

| | | |
|---|---|---|
| 2,089,217 | Mahoney | Dec. 29, 1934 |
| 2,409,816 | Wadsworth | Oct. 22, 1946 |
| 2,602,082 | Owen | July 1, 1952 |
| 2,609,368 | Gaver | Sept. 2, 1952 |

OTHER REFERENCES

"Bacterial Polysaccharides," by T. H. Evans and H. Hibbert, Scientific Report Series No. 6, Sugar Research Foundation, Inc., New York, April 1947, pages 216 to 219.